United States Patent
Qie et al.

(10) Patent No.: US 9,084,109 B2
(45) Date of Patent: Jul. 14, 2015

(54) METHOD FOR SELECTING TEMPORARY CORE NETWORK BASE STATION AND TRUNKING COMMUNICATION SYSTEM

(75) Inventors: Xiaodan Qie, Shenzhen (CN); Xianzhou Zhang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 138 days.

(21) Appl. No.: 13/810,743

(22) PCT Filed: Feb. 24, 2011

(86) PCT No.: PCT/CN2011/071271
§ 371 (c)(1),
(2), (4) Date: Jan. 17, 2013

(87) PCT Pub. No.: WO2012/009975
PCT Pub. Date: Jan. 26, 2012

(65) Prior Publication Data
US 2013/0114399 A1    May 9, 2013

(30) Foreign Application Priority Data
Jul. 23, 2010  (CN) .......................... 2010 1 0238209

(51) Int. Cl.
*H04W 8/30* (2009.01)
*H04W 48/18* (2009.01)

(52) U.S. Cl.
CPC ............... *H04W 8/30* (2013.01); *H04W 48/18* (2013.01)

(58) Field of Classification Search
CPC ........ H04W 8/30; H04W 48/18; H04W 48/20
USPC ................................. 370/221, 217, 327, 328
See application file for complete search history.

(56) References Cited

U.S. PATENT DOCUMENTS

| | | | |
|---|---|---|---|
| 6,522,881 B1* | 2/2003 | Feder et al. | 455/437 |
| 2007/0225028 A1* | 9/2007 | Nelson et al. | 455/524 |
| 2011/0032816 A1* | 2/2011 | Isaksson et al. | 370/225 |

FOREIGN PATENT DOCUMENTS

| | | |
|---|---|---|
| CN | 1913715 | 2/2007 |
| CN | 101052206 | 10/2007 |
| CN | 101489260 | 7/2009 |

OTHER PUBLICATIONS

International Search Report for International Application No. PCT/CN2011/071271 mailed Jun. 2, 2011.

* cited by examiner

*Primary Examiner* — Mohammad Anwar
(74) *Attorney, Agent, or Firm* — Pearl Cohen Zedek Latzer Baratz LLP

(57) ABSTRACT

The disclosure discloses a method for selecting a temporary core network, a base station and a trunking communication system, which solve the technical problem of selecting a temporary core network when a core network fails. In the disclosure, judgment information is transmitted between base stations in real time, and when a core network fails, according to the judgment information and a predetermined judgement rule, a base station is judged as a temporary core network which substitutes for functions of a core network to serve users of each base station, so that the problem of selecting a temporary core network when a core network fails is solved.

11 Claims, 4 Drawing Sheets

METHOD FOR SELECTING TEMPORARY CORE NETWORK BASE STATION AND TRUNKING COMMUNICATION SYSTEM

CROSS-REFERENCE TO RELATED APPLICATIONS

This application is a National Phase Application of PCT International Application No. PCT/CN2011/071271, International Filing Date Feb. 24, 2011, claiming priority of Chinese Patent Application No. 201010238209.3, filed Jul. 23, 2010, which is hereby incorporated by reference.

FIELD OF THE INVENTION

The disclosure relates to the technical field of wireless communications, and in particular to a method for selecting a temporary core network in a Long Term Evolution (LTE) trunking communication system, a base station and a trunking communication system.

BACKGROUND OF THE INVENTION

A trunking communication system is a specific industry application orientated private wireless communication system which is developed for meeting command requirements of industry users. In the trunking communication system, a large number of users share a small number of wireless channels. The trunking communication system is a multipurpose and high-efficient wireless communication system which takes commanding and dispatching as its main application. The trunking communication system has an expansive market in government department, public security, emergency communications, electricity, civil aviation, petrochemical industry, military and other fields.

The trunking communication system is essentially featured by adopting a point-to-multipoint half-duplex communication mode, sharing downlink radio resources by multiple users, having fast commanding and dispatching capabilities like group calling and single calling, high requirement for network reliability and security, and having capabilities like fail-soft and direct mode operation. Because the trunking communication system is applied mostly to military, public security, emergency situation and so on, broadband wireless access system is required to have higher fault-tolerant processing capacity and redundancy backup capacity. Under a condition that a network side (core network) fails, trunking users should be still able to communicate, so as to weaken impact brought by the fault of the network side to the greatest extent and minimize risk. The current broadband digital trunking communication system based on a Time Division-Long Term Evolution (TD-LTE) technology of Datang Telecom usually uses a method that a base station serves as the temporary core network to realize the fail-soft, but no feasible solution about how to select a proper base station as the temporary core network has been presented.

SUMMARY OF THE INVENTION

The disclosure mainly provides a method for selecting a temporary core network, a base station and a trunking communication system, so as to make it possible to effectively switch to a proper base station, and enable the base station to serve users as a temporary core network when a core network fails.

For solving the technical problem, the following technical solutions are provided.

The disclosure provides a method for selecting a temporary core network, which comprises:

setting unified judgment information and judgement rule;

a base station receiving judgment information sent from other base stations and sending judgment information of the base station itself to said other base stations; and after a core network fails, the base station accepting a judgment result made according to the judgment information and the judgement rule by each base station, and serving as a temporary core network.

Preferably, the step of the base station receiving the judgment information sent from said other base stations and sending the judgment information of the base station itself to said other base stations comprises:

the base station receiving the judgment information which is sent from said other base stations in real time or periodically, and sending the judgment information of the base station itself to said other base stations in real time or periodically.

Preferably, the step of the base station accepting the judgment result made according to the judgment information and the judgement rule by each base station, and serving as the temporary core network comprises:

the base station receiving request information of requesting the base station to serve as the temporary core network from said other base stations; and the base station sending response information of agreeing to serve as the temporary core network to said other base stations.

Preferably, the judgment information comprises processing capacity and load information.

The disclosure provides a base station, comprising:

an information setting unit, which is configured to set unified judgment information and judgement rule;

an information receiving unit, which is configured to receive judgment information sent from other base stations and send judgment information of the base station itself to said other base stations; and a judgment result accepting unit, which is configured to, after a core network fails, accept a judgment result made according to the judgment information and the judgement rule by each base station, and serve as a temporary core network.

Preferably, the information receiving unit is configured to receive the judgment information which is sent from said other base stations in real time or periodically, and send the judgment information of the base station itself to said other base stations in real time or periodically.

Preferably, the judgment result accepting unit further comprises:

a request receiving subunit, which is configured to receive request information of requesting the base station to serve as the temporary core network from said other base stations; and a response sending subunit, which is configured to send response information of agreeing to serve as the temporary core network to said other base stations.

Preferably, the judgment information comprises processing capacity and load information.

The disclosure provides a trunking communication system, comprising a first base station and other base stations the number of which is at least one, wherein both the first base station and said other base stations are set with unified judgment information and judgement rule, wherein:

the first base station is configured to receive judgment information sent from said other base stations and send judgment information of the first base station itself to said other base stations, and accept judgment results made according to the judgment information and the judgement rule by said other base stations and serve as a temporary core network after the core network fails; and said other base stations are configured to send the judgment information to the first base station and receive the judgment information sent from the first base station, and judge the first base station as the temporary core network according to the judgment information and the judgement rule after the core network fails.

Preferably, the first base station and said other base stations send the judgment information to each other in real time or periodically.

Preferably, the first base station is further configured to receive request information of requesting the first base station to serve as the temporary core network from said other base stations, and send response information of agreeing to serve as the temporary core network to said other base stations;

said other base stations are further configured to send the request information of requesting the first base station to serve as the temporary core network to the first base station, and receive the response information returned by the first base station.

Implementing the technical solutions of the disclosure has the following beneficial effects: by virtue of the method for selecting a temporary core network, the base station and the trunking communication system which are provided by the disclosure, judgment information is transmitted between the base stations in real time; when the core network fails, according to the judgment information and a predetermined judgement rule, a base station is judged as the temporary core network which substitutes for functions of the core network to serve users of each base station.

DETAILED DESCRIPTION OF THE EMBODIMENTS

For making the technical solutions and the advantages of the disclosure more clear, the disclosure is described below with reference to the accompanying drawings and embodiments in detail. It should be understood that specific embodiments described here are only used for illustrating the disclosure and not intended to limit the disclosure.

Figure 1:
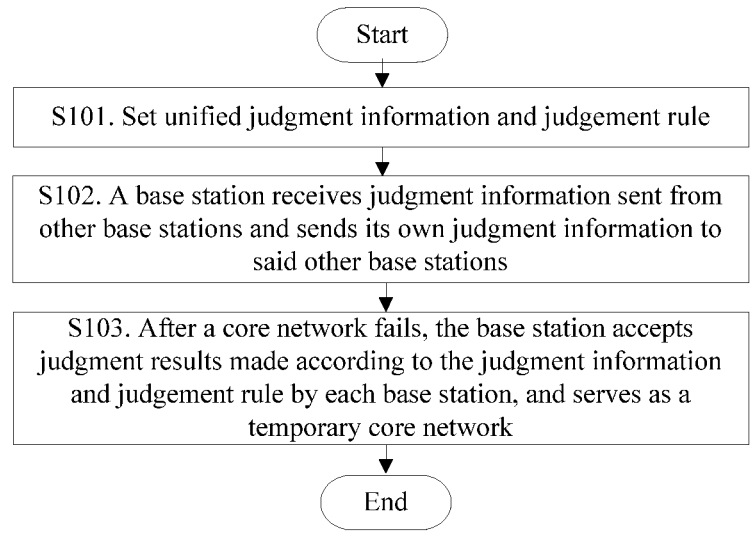
FIG. 1 shows a first flowchart of a method for selecting a temporary core network provided by an embodiment of the disclosure.

An embodiment of the disclosure provides a method for selecting a temporary core network; as shown in FIG. 1, the method comprises the following steps.

Step S101: set unified judgment information and judgement rule;

Unified judgment information and judgement rule are set on all base stations; certainly, the judgment information and the judgement rule are also set on the base station which will be selected as a temporary core network. The judgment information comprises processing capacity and load information. The judgment rule is determining, according to the processing capacity or the load reflected by the load information, that the base station with a low load serves as the temporary core network, or the base station with a high processing capacity serves as the temporary core network.

Step S102: a base station receives judgment information sent from other base stations and sends its own judgment information to said other base stations.

The base station receives judgment information which is sent from said other base stations in real time or periodically, and sends its own judgment information to said other base stations in real time or periodically.

The judgment information is transmitted between the base stations of a trunking communication system through an interface in real time or periodically. If there is a physical interface between two base stations, the judgment information can be transmitted through the interface; if there is no physical interface between two base stations, the judgment information can be forwarded through another base station as a relay base station, wherein there is an interface between the relay base station and each of the two base stations.

Step S103: after a core network fails, a base station accepts judgment results made according to the judgment information and judgement rule by each base station, and serves as the temporary core network.

After the core network fails, according to the judgment information and the judgement rule, the base station with a low load serves as the temporary core network, or the base station with a high processing capacity serves as the temporary core network.

The base station substitutes for functions of the core network to serve users of each base station.

Figure 2:
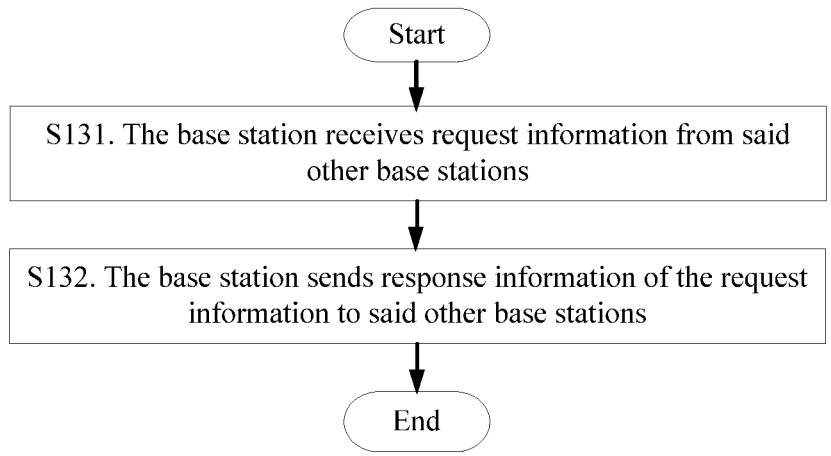
FIG. 2 shows a specific flowchart of accepting judgment results made according to judgment information and a judgement rule by each base station and serving as a temporary core network provided by an embodiment of the disclosure.

As shown in FIG. 2, in another embodiment, the process of the base station accepting the judgment results made according to the judgment information and judgement rule by each base station, and serving as the temporary core network in above Step S103 specifically comprises the following steps.

Step S131: a base station receives request information of requesting the base station to serve as the temporary core network from said other base stations.

When each of said other base stations sends the request information to the base station which is requested to serve as the temporary core network, if there is a physical interface between the two base stations, the request information is directly transmitted through the interface; if there is no physical interface between the two base stations, the request information is forwarded through another base station as a relay.

Step S132: the base station sends response information of agreeing to serve as the temporary core network to said other base stations.

When the base station serving as the temporary core network returns the response information as a reply, if there is a physical interface between two base stations, the request information is directly transmitted through the interface; if there is no physical interface between two base stations, the request information is forwarded through another base station as a relay. If the base station agrees to serve as the temporary core network, the base station returns the response information of agreeing to serve as the temporary core network; if the base station disagrees to serve as the temporary core network, the base station also returns response messages of refusing to serve as the temporary core network. Through the method above, the function of serving users by the base station which serves as the temporary core network can be realized.

Figure 3:
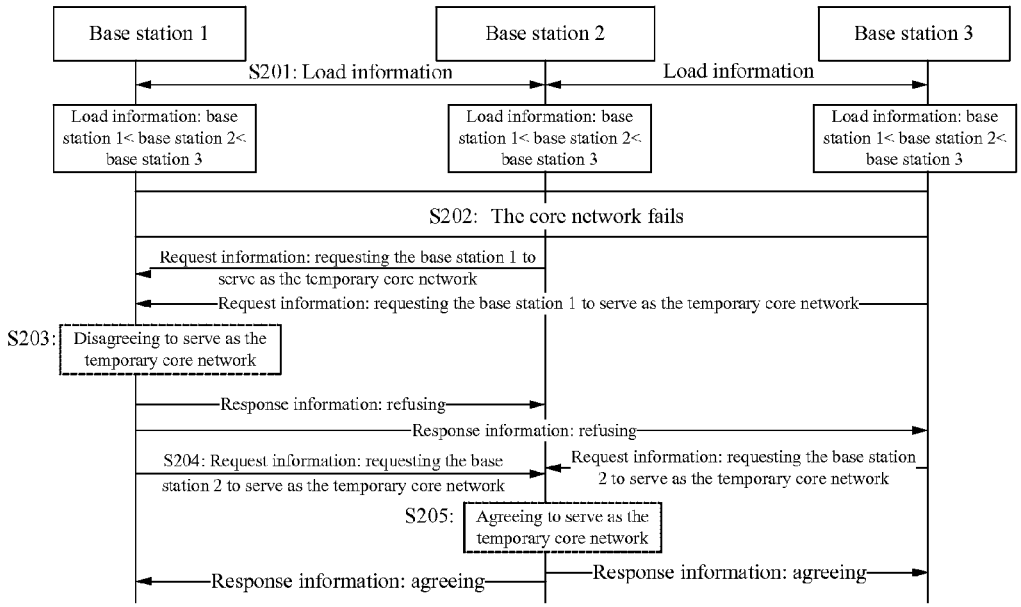
FIG. 3 shows a second flowchart of a method for selecting a temporary core network provided by an embodiment of the disclosure.

FIG. 3 shows a second flowchart of a method for selecting a temporary core network provided by an embodiment of the disclosure. There are three base stations which are respectively base station 1, base station 2 and base station 3 under the core network of the system, and each two base stations have a physical interface therebetween.

Step S201: respective base stations are set with unified judgment information and judgement rule, wherein the judgment information is load information, and the judgement rule is that a base station with a low load serves as the temporary core network. The load information of each base station is transmitted between each two base stations through the interface therebetween in real time or periodically. In the embodiment, the load of the base station 1 is lower than that of the base station 2, and the load of the base station 2 is lower than that of the base station 3. Each base station can receive the load information of the other base stations, and each base station sorts its own load information and the load information of the other base stations, and stores the sorting result in a form of a sorting list.

Step S202: after the core network fails, each base station finds the base station (namely base station 1) with the lowest load according to the sorting list of loads of the base stations; then, the base stations (the base station 2 and the base station 3) send request messages for requesting the base station 1 to serve as the temporary core network to the base station 1 with the lowest load.

Step S203: after receiving the request messages, the base station 1 with the lowest load disagrees to serve as the temporary core network, and returns refusing messages to the other base stations (the base station 2 and the base station 3).

Step S204: after receiving the refusing messages, the other base stations (the base station 1 and the base station 3) send request messages to the base station 2 with the second-lowest load.

Step S205: after receiving the request messages in Step S204, the base station 2 agrees to serve as the temporary core network, and returns agreeing messages to the other base stations (the base station 1 and the base station 3). After receiving response messages of agreeing to serve as the temporary core network, the other base stations (the base station 1 and the base station 3) regard the base station 2 as the temporary core network and communicate with the base station 2.

Figure 4:
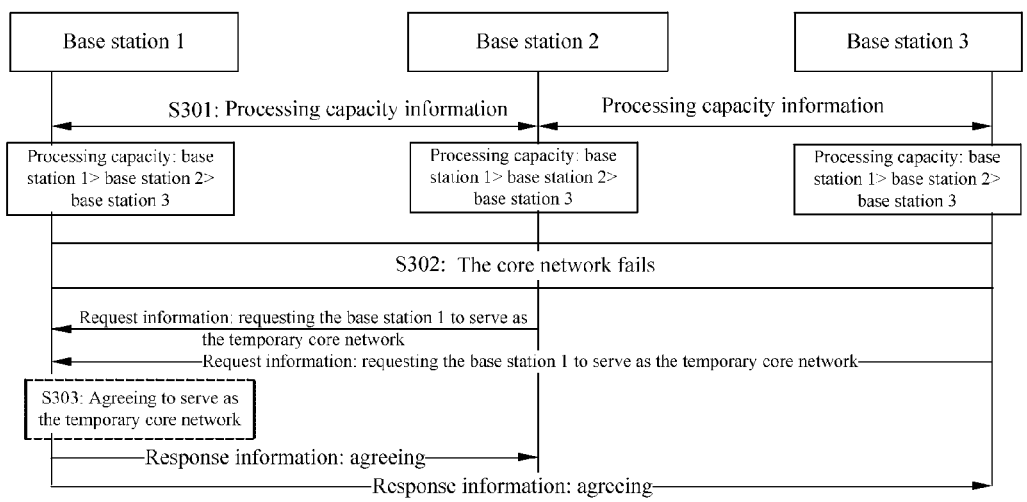
FIG. 4 shows a third flowchart of a method for selecting a temporary core network provided by an embodiment of the disclosure.

FIG. 4 shows a third flowchart of a method for selecting a temporary core network provided by an embodiment of the disclosure.

There are three base stations which are respectively base station 1, base station 2 and base station 3 under the core network, and each two base stations have a physical interface therebetween.

Step S301: all the three base stations are set with unified judgment information and judgement rule, wherein the judgment information is processing capacity of the base station, and the judgement rule is that the base station with a high processing capacity serves as the temporary core network.

The processing capacity of each base station is transmitted between each two base stations through an interface therebetween in real time or periodically. In the embodiment, the processing capacity of the base station 1 is higher than that of the base station 2, and the processing capacity of the base station 2 is higher than that of the base station 3. Each base station can receive the processing capacities of the other base stations; each base station sorts its own processing capacity and the processing capacities of the other base stations, and stores the sorting result in a form of a sorting list.

Step S302: after the core network fails, each base station finds the base station (namely base station 1) with the highest processing capacity according to the sorting list of processing capacities of the base stations; then, the base stations (the base station 2 and the base station 3) send request messages for requesting the base station 1 to serve as the temporary core network to the base station 1 with the highest processing capacity.

Step S303: after receiving the request messages, the base station 1 with the highest processing capacity agrees to serve as the temporary core network, and returns response messages to the other base stations (the base station 2 and the base station 3) to inform the agreeing information; after receiving response messages of agreeing to serve as the temporary core network, the other base stations (the base station 2 and the base station 3) regard the base station 1 as the temporary core network and communicate with the base station 1.

Figure 5:
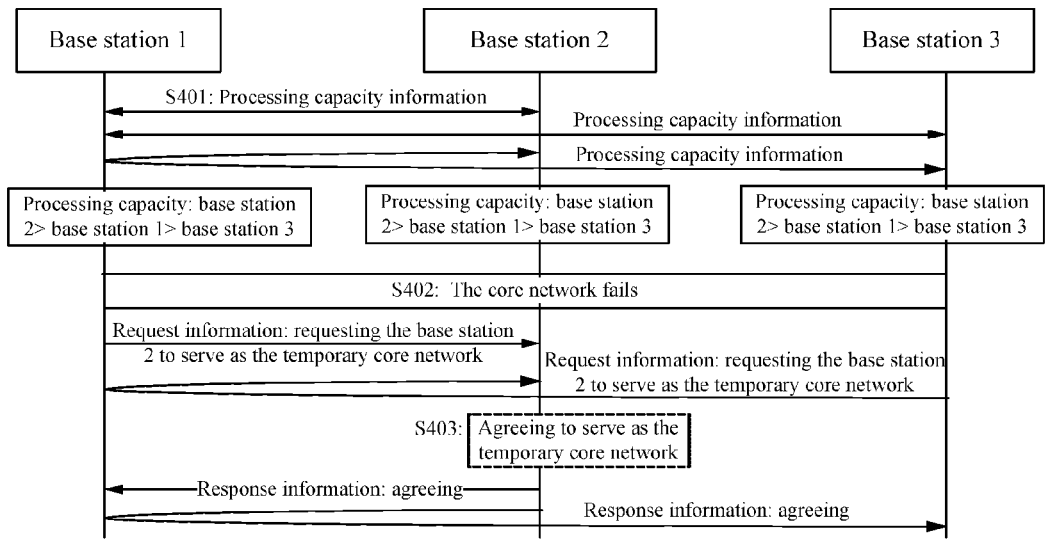
FIG. 5 shows a fourth flowchart of a method for selecting a temporary core network provided by an embodiment of the disclosure.

FIG. 5 shows a fourth flowchart of a method for selecting a temporary core network provided by an embodiment of the disclosure.

There are three base stations which are respectively base station 1, base station 2 and base station 3 under the core network, wherein there is no physical interface between the base station 2 and the base station 3, and information between the base station 2 and the base station 3 is needed to be forwarded through the base station 1.

Step S401: all the three base stations are set with unified judgment information and judgement rule, wherein the judgment information is processing capacity, and the judgement rule is that the base station with a high processing capacity serves as the temporary core network. The processing capacity of each base station is respectively transmitted between the base station 1 and the base station 2, and between the base station 1 and the base station 3 through the interface therebetween in real time or periodically. Each base station can receive the processing capacities of the other base stations; each base station sorts its own processing capacity and the processing capacities of the other base stations, and stores the sorting result in a form of a sorting list.

Step S402: after the core network fails, each base station finds the base station (namely base station 2) with the lowest load according to the sorting list of loads of the base stations; then, the base station 1 sends a request message to the base station 2 with the highest processing capacity through the interface between the base station 1 and the base station 2, for requesting the base station 2 to serve as the temporary core network; the base station 3 sends a request message of requesting the base station 2 to serve as the temporary core network through the forwarding of the base station 1.

Step S403: after receiving the request messages, the base station 2 with the highest processing capacity agrees to serve as the temporary core network, returns a response message to the base station 1 which is in direct physical connection with the base station 2, and sends a response message to the base station 3 through the forwarding of the base station 1. After receiving the response messages of agreeing to serve as the temporary core network, the other base stations (the base station 1 and the base station 3) regard the base station 2 as the temporary core network and communicate with the base station 2.

Figure 6:
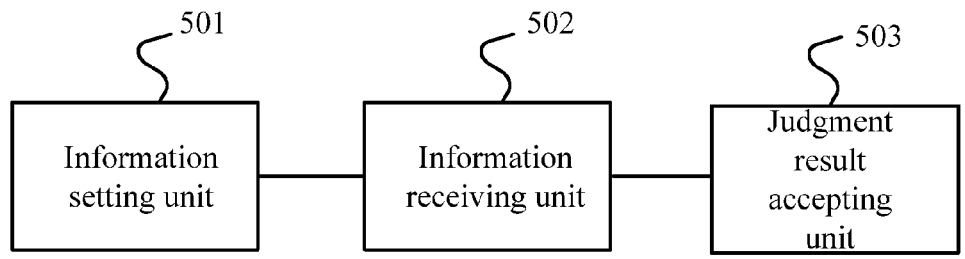
FIG. 6 shows a structure diagram of a base station provided by an embodiment of the disclosure.

As shown in FIG. 6, an embodiment of the disclosure provides a base station, which comprises: an information setting unit 501, an information receiving unit 502 and a judgment result accepting unit 503.

The information setting unit 501 is configured to set unified judgment information and judgement rule, wherein the judgment information comprises processing capacity and load information; the judgement rule is determining, according to the processing capacity or load reflected by the load information, that the base station with a low load serves as the temporary core network, or the base station with a high processing capacity serves as the temporary core network.

The information receiving unit 502 is configured to receive the judgment information sent from other base stations and send its own judgment information to said other base stations. In specific embodiment, the information receiving unit 502 is configured to receive the judgment information which is sent from said other base stations in real time or periodically, and send its own judgment information to said other base stations in real time or periodically.

The judgment result accepting unit 503 is configured to, after the core network fails, accept judgment results made according to the judgment information and judgement rule by each base station, and serve as the temporary core network.

For the base station provided by the embodiment, the judgment information is transmitted between the base stations in real time. When a core network fails, according to the judgment information and the predetermined judgement rule, a base station is judged as a temporary core network which substitutes for functions of the core network to serve the users of each base station.

Figure 7:
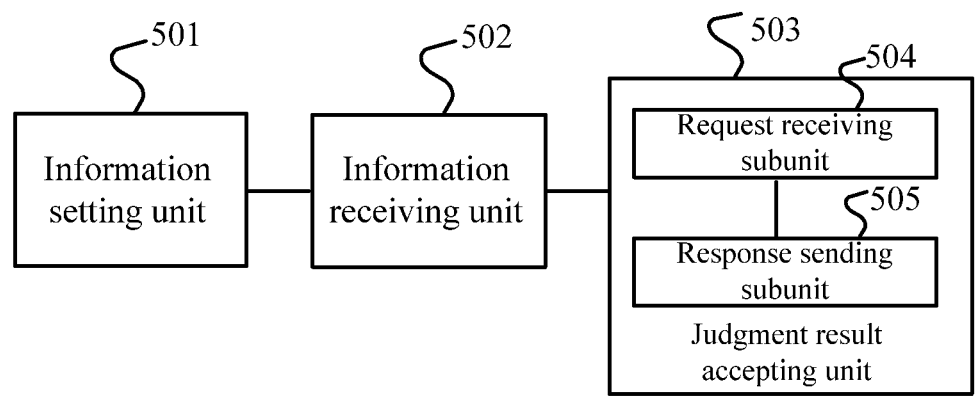
FIG. 7 shows another structure diagram of a base station provided by an embodiment of the disclosure.

As shown in FIG. 7, in a further embodiment, the judgment result accepting unit 503 further comprises:

a request receiving subunit 504, which is configured to receive request information of requesting the base station to serve as the temporary core network from said other base stations;

a response sending subunit 505, which is configured to send response information of agreeing to serve as the temporary core network to said other base stations, so that the function of serving the users by the base station which serves as the temporary core network is realized.

The judgment information comprises processing capacity and load information.

Figure 8:
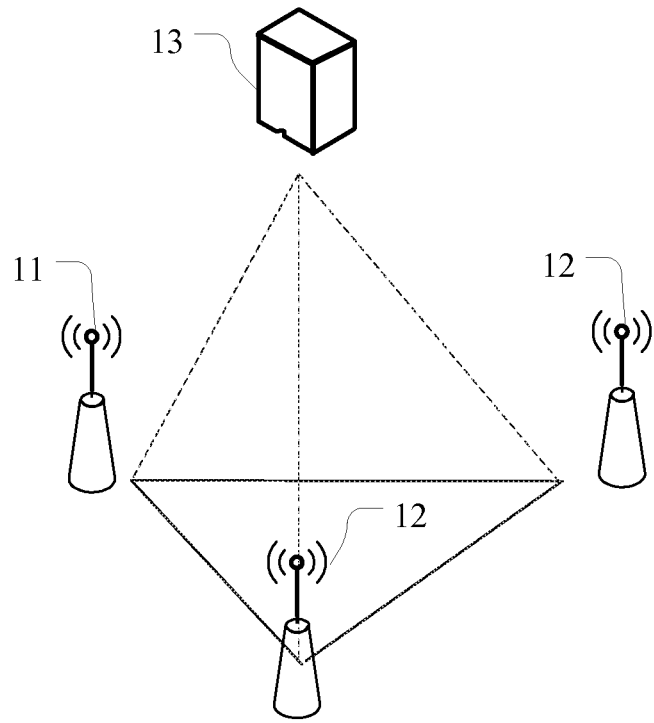
FIG. 8 shows an architecture diagram of a trunking communication system provided by an embodiment of the disclosure.

As shown in FIG. 8, an embodiment of the disclosure also provides a trunking communication system, which comprises: a first base station 11 and other base stations 12 the number of which is at least one; the first base station 11 and said other base stations 12 are set with unified judgment information and judgement rule, and the first base station 11 and said other base stations 12 are all coupled with a server wirelessly. The judgment information comprises processing capacity and load information. The judgment rule is determining, according to the processing capacity or load reflected by the load information, that the base station with a low load serves as the temporary core network, or the base station with a high processing capacity serves as the temporary core network.

In the trunking communication system:

the first base station 11 is configured to receive judgment information sent from said other base stations 12 and send its own judgment information to said other base stations 12, and accept judgment results made according to the judgment information and judgement rule by said other base stations 12 and serve as the temporary core network after the core network fails;

said other base stations 12 are configured to send the judgment information to the first base station 11 and receive the judgment information sent from the first base station 11, and accept judgment results made according to the judgment information and judgement rule by the base station 11 and serve as the temporary core network after the core network fails. In the embodiment, the first base station 11 and said other base stations 12 transmit judgment information to each other in real time or periodically.

By virtue of the system provided by the embodiment, the judgment information is transmitted between the base stations in real time. When a core network fails, according to the judgment information and the predetermined judgement rule, a base station is judged as a temporary core network which substitutes for functions of the core network to serve the users of each base station.

In a further embodiment, the first base station 11 is configured to receive request information of requesting the first base station to serve as the temporary core network from said other base stations 12, and send response information of agreeing to serve as the temporary core network to said other base stations 12;

said other base stations 12 are configured to send request information of requesting the first base station 11 to serve as the temporary core network to the first base station 11, and receive response information returned by the first base station 11.

By virtue of the system, the function of serving the users by the base station which serves as the temporary core network is realized.

The above is only the preferred embodiments of the disclosure and not intended to limit the disclosure; any modifications, equivalent replacements, improvements and the like within the principle of the disclosure shall fall within the scope of the claims of the disclosure.

What is claimed is:

1. A method for selecting a temporary core network, comprising:

setting unified judgment information and judgment rule;

a first base station receiving judgment information sent from other base stations and sending judgment information of the first base station itself to said other base stations; and after a core network fails, the first base station accepting a judgment result made according to the judgment information and the judgment rule by each base station, and serving as a temporary core network;

when the first base station disagrees to serve as the temporary core network, the first base station returning refusing messages to said other base stations; the first base station and said other base stations except a second base station sending request messages to the second base station; after receiving the request messages, the second base station agreeing to serve as the temporary core network, and returning agreeing messages to the first base station and said other base stations except the second base station.

2. The method according to claim 1, wherein the step of the first base station receiving the judgment information sent from said other base stations and sending the judgment information of the first base station itself to said other base stations comprises:

the first base station receiving the judgment information which is sent from said other base stations in real time or periodically, and sending the judgment information of the first base station itself to said other base stations in real time or periodically.

3. The method according to claim 1, wherein the step of the first base station accepting the judgment result made according to the judgment information and the judgment rule by each base station, and serving as the temporary core network comprises:
the first base station receiving request information of requesting the first base station to serve as the temporary core network from said other base stations; and
the first base station sending response information of agreeing to serve as the temporary core network to said other base stations.

4. The method according to claim 1, wherein the judgment information comprises processing capacity and load information.

5. A base station, comprising:
an information setting unit, which is configured to set unified judgment information and judgment rule;
an information receiving unit, which is configured to receive judgment information sent from other base stations and send judgment information of the base station itself to said other base stations; and
a judgment result accepting unit, which is configured to, after a core network fails, accept a judgment result made according to the judgment information and the judgment rule by each base station, and serve as a temporary core network;
the base station is further configured to, when the base station disagrees to serve as the temporary core network, return refusing messages to said other base stations; the base station is further configured to send a request message to a second base station in said other base stations, wherein said other base stations except the second base station also send request messages to the second base station, after receiving the request messages, the second base station agrees to serve as the temporary core network, and returns agreeing messages to the base station and said other base stations except the second base station.

6. The base station according to claim 5, wherein the information receiving unit is configured to receive the judgment information which is sent from said other base stations in real time or periodically, and send the judgment information of the base station itself to said other base stations in real time or periodically.

7. The base station according to claim 5, further comprising:
a request receiving subunit, which is configured to receive request information of requesting the base station to serve as the temporary core network from said other base stations; and
a response sending subunit, which is configured to send response information of agreeing to serve as the temporary core network to said other base stations.

8. The base station according to claim 5, wherein the judgment information comprises processing capacity and load information.

9. A trunking communication system, comprising a first base station and other base stations the number of which is at least one, wherein both the first base station and said other base stations are set with unified judgment information and judgment rule,
the first base station is configured to receive judgment information sent from said other base stations and send judgment information of the first base station itself to said other base stations, and accept judgment results made according to the judgment information and the judgment rule by said other base stations and serve as a temporary core network after the core network fails; and
said other base stations are configured to send the judgment information to the first base station and receive the judgment information sent from the first base station, and judge the first base station as the temporary core network according to the judgment information and the judgment rule after the core network fails;
wherein the first base station is further configured to, when the first base station disagrees to serve as the temporary core network, return refusing messages to said other base stations; the first base station and said other base stations except a second base station are further configured to send request messages to the second base station; after receiving the request messages, the second base station is configured to agree to serve as the temporary core network, and return agreeing messages to the first base station and said other base stations except the second base station.

10. The trunking communication system according to claim 9, wherein the first base station and said other base stations send the judgment information to each other in real time or periodically.

11. The trunking communication system according to claim 9, wherein
the first base station is further configured to receive request information of requesting the first base station to serve as the temporary core network from said other base stations, and send response information of agreeing to serve as the temporary core network to said other base stations;
said other base stations are further configured to send the request information of requesting the first base station to serve as the temporary core network to the first base station, and receive the response information returned by the first base station.

* * * * *